(12) United States Patent
Toshiyoshi et al.

(10) Patent No.: US 11,848,614 B2
(45) Date of Patent: Dec. 19, 2023

(54) POWER SUPPLY CIRCUIT AND VIBRATION-DRIVEN ENERGY HARVESTER (71) Applicants: The University of Tokyo, Tokyo (JP); Saginomiya Seisakusho, Inc., Tokyo (JP)

(72) Inventors: Hiroshi Toshiyoshi, Tokyo (JP); Hisayuki Ashizawa, Sayama (JP); Masahiro Morita, Sayama (JP)

(73) Assignees: The University of Tokyo, Tokyo (JP); Saginomiya Seisakusho, Inc., Tokyo (JP)

(*) Notice: Subject to any disclaimer, the term of this patent is extended or adjusted under 35 U.S.C. 154(b) by 617 days.

(21) Appl. No.: 17/059,959

(22) PCT Filed: May 30, 2019

(86) PCT No.: PCT/JP2019/021615
§ 371 (c)(1),
(2) Date: Nov. 30, 2020

(87) PCT Pub. No.: WO2019/230915
PCT Pub. Date: Dec. 5, 2019

(65) Prior Publication Data
US 2021/0226539 A1 Jul. 22, 2021

(30) Foreign Application Priority Data
May 31, 2018 (JP) ................. 2018-105435

(51) Int. Cl.
H02M 3/335 (2006.01)
H02J 50/00 (2016.01)

(52) U.S. Cl.
CPC .......... *H02M 3/335* (2013.01); *H02J 50/001* (2020.01)

(58) Field of Classification Search
CPC ......... H02N 2/18; H02N 2/181; H02M 3/335; H02J 50/001; H10N 30/30; H10N 30/306; H10N 30/802
See application file for complete search history.

(56) References Cited

U.S. PATENT DOCUMENTS

2012/0224398 A1* 9/2012 Franco ................ H02M 3/335
323/311
2013/0341936 A1* 12/2013 Wood .................... H02N 2/188
290/1 R
(Continued)

FOREIGN PATENT DOCUMENTS

JP 2010-199280 A 5/2010
JP 2013-46552 A 3/2013
(Continued)

OTHER PUBLICATIONS

Extended European Search Report issued in European Application No. 19810676.7 dated Feb. 16, 2022 (five (5) pages).
(Continued)

*Primary Examiner* — J. San Martin
*Assistant Examiner* — Jaydi San Martin
(74) *Attorney, Agent, or Firm* — Crowell & Moring LLP (57) ABSTRACT A power supply circuit that outputs an electric power that is input from a vibration-driven energy harvesting element to an external load, includes: a negative half-wave rectifying circuit that half-wave rectifies an alternating current power that is input from the vibration-driven energy harvesting element, into a negative voltage output; an inverting chopper circuit that inverts and outputs the negative voltage output which is output from the negative half-wave rectifying circuit, into a positive voltage output.

10 Claims, 7 Drawing Sheets (56) References Cited

U.S. PATENT DOCUMENTS

2014/0065751 A1    3/2014  Suzuki et al.
2016/0315563 A1*  10/2016  Horiguchi .............. H02N 2/181
2022/0294367 A1*   9/2022  Noda ................... H10N 30/304

FOREIGN PATENT DOCUMENTS

| JP | 2014-49557 A | 3/2014 |
| JP | 2016-127656 A | 7/2016 |
| JP | 5990352 B1 | 9/2016 |
| JP | 6002497 B2 | 10/2016 |
| JP | 2018-74823 A | 5/2018 |
| WO | WO 2017/067446 A1 | 4/2017 |

OTHER PUBLICATIONS

International Search Report (PCT/ISA/210) issued in PCT Application No. PCT/JP2019/021615 dated Jul. 23, 2019 with English translation (two (2) pages).
Japanese-language Written Opinion (PCT/ISA/237) issued in PCT Application No. PCT/JP2019/021615 dated Jul. 23, 2019 (three (3) pages).

* cited by examiner

POWER SUPPLY CIRCUIT AND VIBRATION-DRIVEN ENERGY HARVESTER

TECHNICAL FIELD

The present invention relates to a power supply circuit and a vibration-driven energy harvester.

BACKGROUND ART

As one of energy harvesting technologies for harvesting energy from environmental vibration, there is known an approach of generating an electric power from environmental vibration using a vibration-driven energy harvesting element which is a MEMS (Micro Electro Mechanical System) vibration element. The vibration-driven energy harvesting element itself includes a piezoelectric element or a capacitance-type element. When the element is vibrated at a frequency of environmental vibration, the element generates an alternating current power having the same frequency. Thus, there has been proposed a vibration-driven energy harvester that combines a vibration-driven energy harvesting element and a power supply circuit converting an alternating current power generated by the vibration-driven energy harvesting element into a direct current voltage or an alternating current voltage suitable for use (see PTL1, for example). In PTL1, a general two-phase full-wave rectifying circuit is used as a rectifying circuit for rectifying an alternating current power generated by a capacitance-type vibration-driven energy harvesting element (i.e., for converting alternating current to direct current).

CITATION LIST

Patent Literature

PTL1: Japanese Patent No. 5990352

SUMMARY OF INVENTION

Technical Problem

Since vibration energy of environmental vibration is weak, a power supply circuit and a vibration-driven energy harvester that convert environmental vibration into electric energy with a high efficiency are required.

Solution to Problem

A power supply circuit according to the 1st aspect that outputs an electric power that is input from a vibration-driven energy harvesting element to an external load, comprises: a negative half-wave rectifying circuit that half-wave rectifies an alternating current power that is input from the vibration-driven energy harvesting element, into a negative voltage output; an inverting chopper circuit that inverts and outputs the negative voltage output which is output from the negative half-wave rectifying circuit, into a positive voltage output.

The power supply circuit according to the 2nd aspect is in the power supply circuit according to the 1st aspect, it is preferable that the power supply circuit further comprises: a voltage conversion circuit that converts the positive voltage output which is output from the inverting chopper circuit, and outputs the voltage to the external load.

The power supply circuit according to the 3rd aspect is in the power supply circuit according to the 1st or 2nd aspect, it is preferable that the power supply circuit further comprises: a first capacitor having one end connected to an output terminal of the negative half-wave rectifying circuit and another end connected to a ground, the first capacitor accumulating the negative voltage output which is output from the negative half-wave rectifying circuit and outputting the negative voltage output to the inverting chopper circuit.

The power supply circuit according to the 4th aspect is in the power supply circuit according to the 3rd aspect, it is preferable that the power supply circuit further comprises: a second capacitor having one end connected to an output terminal of the inverting chopper circuit and another end connected to the ground, the second capacitor accumulating the positive voltage output which is output from the inverting shopper circuit.

The power supply circuit according to the 5th aspect is in the power supply circuit according to the 3rd or 4th aspect, it is preferable that the power supply circuit further comprises: a control circuit that turns on a switching element for controlling a chopper timing in the inverting chopper circuit when a voltage at the one end of the first capacitor becomes a first reference negative voltage, and turns off the switching element when a voltage at the one end of the first capacitor becomes a second reference negative voltage, the second reference negative voltage being more positive than the first reference negative voltage.

The power supply circuit according to the 6th aspect is in the power supply circuit according to the 5th aspect, it is preferable that the control circuit comprises: a Zener diode that has an anode facing the one end of the first capacitor between the one end and the other end of the first capacitor; a resistor element that is arranged between the first capacitor and the Zener diode; and a voltage divider that is arranged between the one end and the other end of the first capacitor and divides a voltage across the one end of the first capacitor and the other end of the first capacitor, wherein the control circuit turns on and off the switching element, based on a comparison and determination about which of a voltage applied across both ends of the Zener diode and an output voltage of the voltage divider is higher or lower.

The power supply circuit according to the 7th aspect is in the power supply circuit according to the 6th aspect, it is preferable that the resistance element has one end connected to the one end of the first capacitor and the other end connected to the anode of the Zener diode; and the cathode of the Zener diode is connected to the other end of the first capacitor.

The power supply circuit according to the 8th aspect is in the power supply circuit according to the 6th or 7th aspect, it is preferable that the control circuit includes a comparator circuit, an input-side feedback resistor, and an output-side feedback resistor; a voltage of the anode of the Zener diode is input to a first input of the comparator circuit; the output voltage of the voltage divider is input through the input-side feedback resistor to a second input of the comparator circuit, and an output of the comparator circuit is input through the output-side feedback resistor; and the switching element is turned on and off based on the output of the comparator circuit.

A vibration-driven energy harvester according to the 9th aspect comprises: the power supply circuit according to any one of the 1st to 8th aspects; and a vibration-driven energy harvesting element that supplies an electric power to the power supply circuit.

The vibration-driven energy harvester according to the 10th aspect is in the vibration-driven energy harvester according to the 9th aspect, it is preferable that an electrode having an electret with negative charges is connected to an input terminal of the negative half-wave rectifying circuit of the power supply circuit, and an electrode having no electret formed therein is connected to a ground of the power supply circuit, or the electrode having no electret formed therein is connected to the input terminal of the negative half-wave rectifying circuit of the power supply circuit, and the electrode having an electret with positive charges formed therein is connected to the ground of the power supply circuit.

Advantageous Effects of Invention

According to the present invention, energy of environmental vibration can be converted into electric energy with a high efficiency.

BRIEF DESCRIPTION OF DRAWINGS

FIG. 7 is a view schematically illustrating a vibration-driven energy harvesting element 10a included in the vibration-driven energy harvester 100a.

DESCRIPTION OF EMBODIMENTS

First Embodiment

Figure 1:
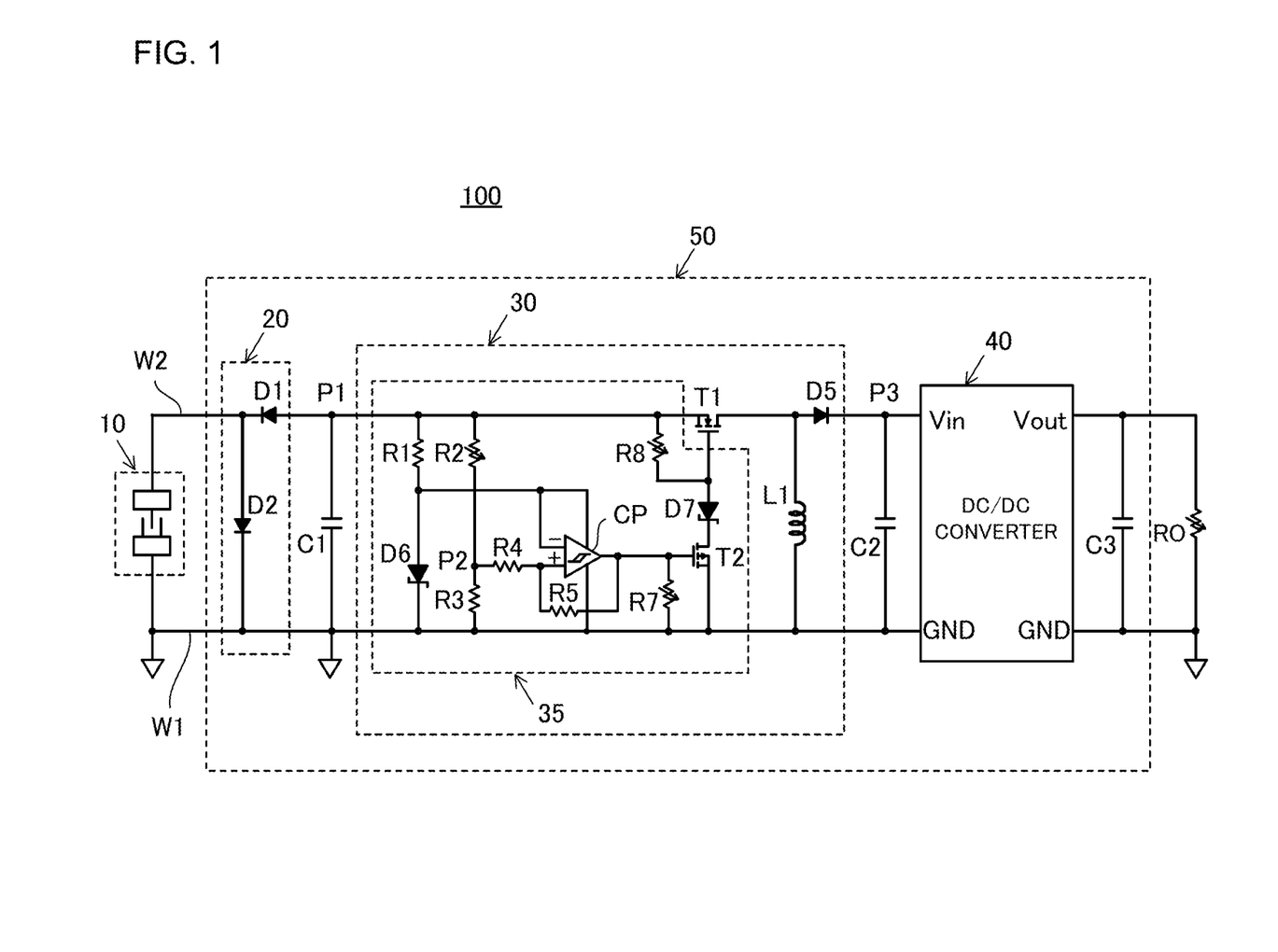
FIG. 1 is a schematic diagram showing a schematic configuration of a power supply circuit 50 and a vibration-driven energy harvester 100 of a first embodiment according to the present invention.

Now, a first embodiment according to the present invention will be described with reference to the drawings. FIG. 1 is a schematic diagram showing a schematic configuration of a power supply circuit 50 and a vibration-driven energy harvester 100 of the first embodiment according to the present invention. The vibration-driven energy harvester 100 includes a vibration-driven energy harvesting element 10 that generates an alternating current power due to environmental vibration, and the power supply circuit 50 that extracts the generated alternating current power as a power source.

The power supply circuit 50 includes a negative half-wave rectifying circuit 20 that outputs only negative voltage components of the power input from the vibration-driven energy harvesting element 10 and an inverting chopper circuit 30 that converts the negative voltage power from the negative half-wave rectifying circuit 20 into a positive voltage. The power supply circuit 50 may further include a voltage conversion circuit 40 that converts the positive voltage power from the inverting chopper circuit 30 into a predetermined positive voltage power.

Figure 2:
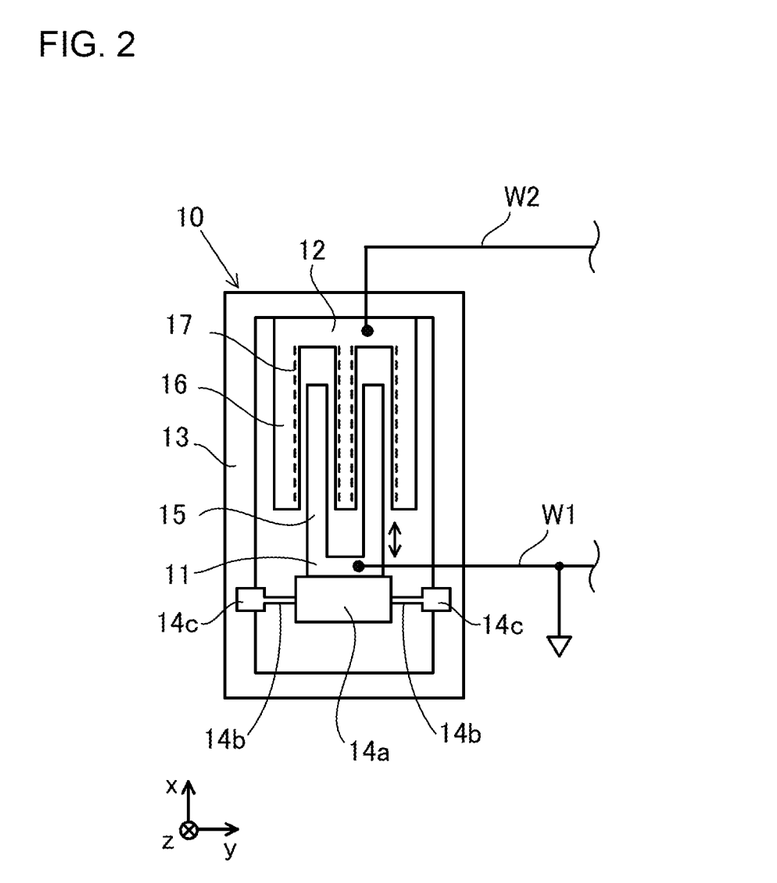
FIG. 2 is a view schematically illustrating a vibration-driven energy harvesting element 10 included in the vibration-driven energy harvester 100.

The vibration-driven energy harvesting element 10 is a capacitance-type power generation element (electret-type power generation element) including electret electrodes, as one example, and the outline thereof will be described with reference to FIG. 2.

The vibration-driven energy harvesting element 10 has a first electrode 11 which is a movable electrode and a second electrode 12 which is a fixed electrode. The first electrode 11 is a comb electrode having two comb portions 15 as one example, and the second electrode 12 is a comb electrode having three comb portions 16 as one example.

The comb portions 15 of the first electrode 11 and the comb portions 16 of the second electrode 12 have a predetermined thickness in the Z direction in the figure. The first electrode 11 and the second electrode 12 face each other in portions where they mesh with each other. The first electrode 11 and the second electrode 12 can be manufactured, for example, as a MEMS structure with silicon as a base material.

In the comb portions 16 of the second electrode 12, surface regions 17 on sides facing the comb portions 15 of the first electrode 11 have electrets with negative charges formed by being subjected to a known charging process (for example, a charging process described in Japanese Patent Laid-Open Publication No. 2014-049557).

Due to the electretization, the comb portions 16 of the second electrode 12 are semi-permanently charged. As a result, in the comb portions 15 of the first electrode 11 facing the electretized electrode, induced charges having characteristics opposite to those of the charges of the electretized electrode, that is, positive induced charges are induced.

The second electrode 12 is fixedly held by an insulating support frame 13.

On the other hand, the first electrode 11 is held by a holder 14 (an electrode holding portion 14a, connecting portions 14b, fixing portions 14c) to vibrate with respect to the support frame 13 in the vertical direction (X direction) in the figure. The holder 14 includes the electrode holding portion 14a that holds the first electrode 11, the fixing portions 14c that are fixed to the support frame 13, and the flexible connecting portions 14b that connect the electrode holding portion 14a to the fixing portions 14c.

The connecting portion 14b is a thin piece made of a flexible material such as metal, having a small thickness in the X direction and a large thickness in the Z direction in FIG. 1. When vibration is applied to the support frame 13 from outside, the two connecting portions 14b provided on the left and right of the electrode holding portion 14a in the figure are bent, so that the electrode holding portion 14a vibrates in the X direction with respect to the support frame 13. As a result, the first electrode 11 held by the electrode holding portion 14a vibrates in the X direction with respect to the second electrode 12 fixed to the support frame 13.

The vibration between the first electrode 11 and the second electrode 12 in the X direction increases or decreases areas of surfaces where the comb portions 15 of the first electrode 11 and the comb portions 16 of the second electrode 12 face each other. This results in a change in areas of the facing portions between the first electrode 11 and the second electrode 12, a change in charges induced by the electrets, and a change in a potential difference between the first electrode 11 and the second electrode 12 to generate an electromotive force. Thus, an electric power is generated by the vibration-driven energy harvesting element 10.

The vibration-driven energy harvesting element 10 converts energy of vibration in an environment where the vibration-driven energy harvester 100 is installed into electric energy to generate an alternating current power.

Of two output lines through which an alternating current voltage is output from the vibration-driven energy harvesting element 10, an output line W2 connected to the second electrode 12 is connected to an input terminal of the negative half-wave rectifying circuit 20 in FIG. 1, and an output line W1 connected to the first electrode 11 is connected to a ground. Note that, via the ground, the output line W1 is also connected to a ground of the negative half-wave rectifying circuit 20 (a ground of the power supply circuit 50).

The negative half-wave rectifying circuit 20 includes a first diode D1 having a cathode connected to one end of the vibration-driven energy harvesting element 10 and a second diode D2 having an anode connected to the one end of the vibration-driven energy harvesting element 10 and the cathode of the first diode D1. The input terminal of the negative half-wave rectifying circuit 20 is the cathode of the first diode D1 and the anode of the second diode D2. An output terminal of the negative half-wave rectifying circuit 20 is an anode of the first diode D1.

When the alternating current voltage input from the second electrode 12 of the vibration-driven energy harvesting element 10 to the negative half-wave rectifying circuit 20 via the output line W2 is a positive voltage, the alternating current voltage passes through the second diode D2 to the ground side as a current with substantially no resistance. Therefore, only negative voltage components of the alternating current voltage that is input to the negative half-wave rectifying circuit 20 are output from the negative half-wave rectifying circuit 20 through the first diode D1.

One end of a first capacitor C1 is connected to the anode of the first diode D1 which is the output terminal of the negative half-wave rectifying circuit 20, and the other end of the first capacitor C1 is connected to a ground. The negative power output from the negative half-wave rectifying circuit 20 is accumulated in the first capacitor C1 and supplied to the inverting chopper circuit 30 from the first capacitor C1.

The output power from the negative half-wave rectifying circuit 20, which is a pulsed output, is temporally made smoother by the first capacitor C1, so that an electric power can be stably supplied to the inverting chopper circuit 30. Thus, the efficiency of power transmission by the inverting chopper circuit 30 can be improved.

Figure 3A:
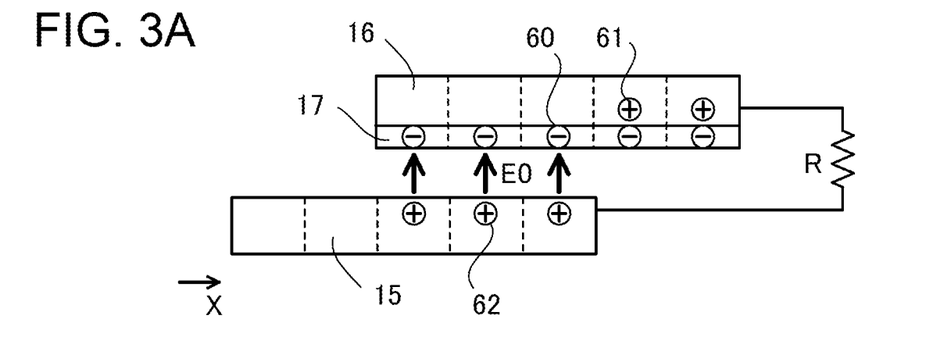
FIGS. 3A to 3C are views illustrating an operating principle of the vibration-driven energy harvesting element 10.
Figure 3B:
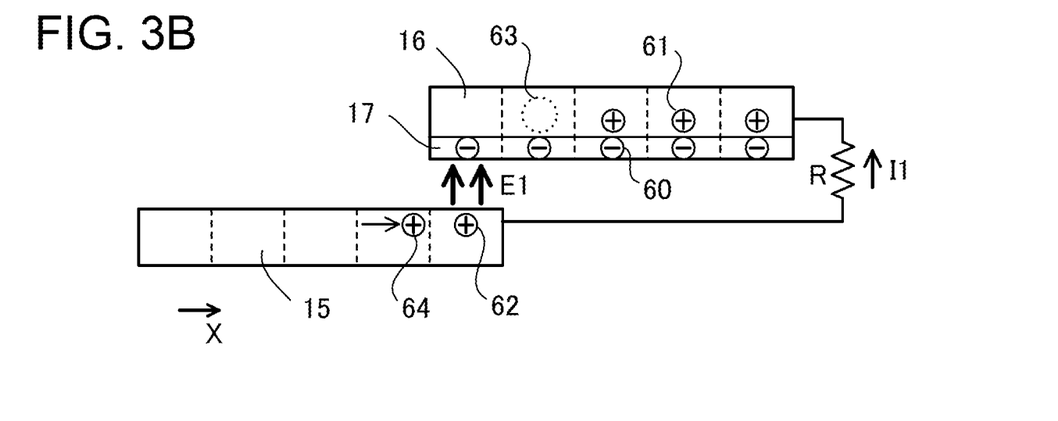
Figure 3C:
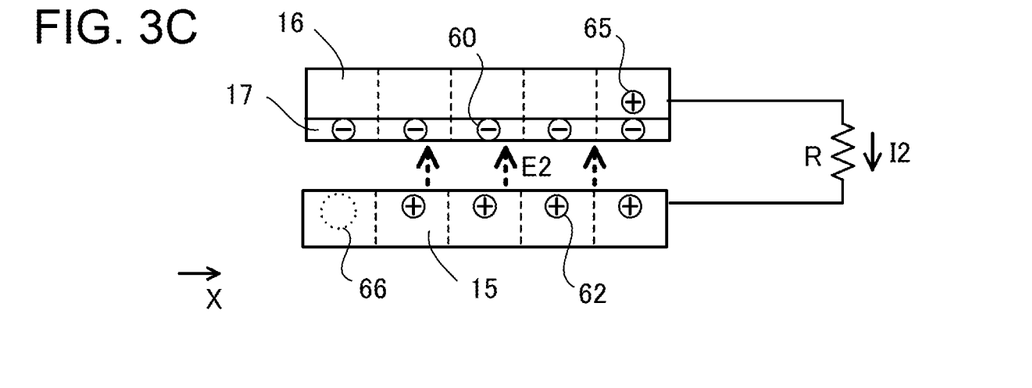

FIG. 3 is a view schematically showing an operational principle of the vibration-driven energy harvesting element 10. Now, the reason why the energy conversion efficiency of the vibration-driven energy harvester 100 of the first embodiment is high will be described with reference to FIG. 3.

FIG. 3(a) to (c) are views showing how the comb portions 15 of the first electrode 11 and the comb portions 16 of the second electrode 12 shown in FIG. 3 relatively move in the X direction in FIG. 1. In the description of FIG. 3, for simplification, the comb portions 15 of the first electrode 11 are referred to as a first electrode 15 and the comb portions 16 of the second electrode 12 are referred to as a second electrode 16.

FIG. 3(a) is a view showing a state in which the first electrode 15 and the second electrode 16 face each other in their predetermined portions. In a surface region 17 of the second electrode 16 facing the first electrode 15, an electret charged with negative charges 60 is formed.

The negative charges 60 induce positive charges 62 in a surface of the first electrode 15 facing the second electrode 16. On the other hand, in a portion of the second electrode 16 that does not face the first electrode 15, the negative charges 60 in the region 17 induce positive charges 61 inside the second electrode 16.

The positive charges 62 induced in the first electrode 15 and the negative charges 60 due to the electret in the surface of the second electrode 16 generate an electric field E0 in a facing portion between the first electrode 15 and the second electrode 16.

A resistor R in FIG. 3(a) represents the power supply circuit 50 and an external load R0, to which the vibration-driven energy harvesting element 10 is connected, as a resistor. When the vibration-driven energy harvesting element 10 vibrates in the electric field E0, a voltage generated with a change in an electrostatic capacitance between the first electrode and the second electrode is applied to the resistor R. In examples shown in FIGS. 3(b), (c), an output voltage of the vibration-driven energy harvesting element 10 increases or decreases with vibration between the first electrode 15 and the second electrode 16, as compared with the example shown in FIG. 3(a).

FIG. 3(b) shows a case where the first electrode 15 and the second electrode 16 relatively move in the X direction from the state shown in FIG. 3(a). Here, the area of the facing portion between the first electrode 15 and the second electrode 16 becomes smaller than that in the state shown in FIG. 3(a).

The state shown in FIG. 3(b) decreases the positive charges 62 in the surface of the first electrode 15 that has been induced by the negative charges 60 in the surface of the second electrode 16, while increasing the positive charges 61 in the second electrode 16 that has been induced by the negative charges 60, as compared with the state shown in FIG. 3(a).

Therefore, when the state of FIG. 3(a) is changed to the state of FIG. 3(b) due to the vibration between the electrodes, some of the positive charges 62 induced in the first electrode 15 in FIG. 3(a) try to move from the first electrode 15 to the second electrode 16 via the resistor R as a current I1 (precisely, electrons try to move from the second electrode 16 to the first electrode 15). Therefore, the first electrode 15 has a positive potential with respect to the second electrode 16.

However, because this movement of the charges is hindered by the electric resistance of the resistor R, positive residual charges 64 remain in the first electrode 15 while a positive charge deficient portion 63 is generated in a part of the portion in the second electrode 16 facing the negative charges 60. The positive residual charge 64 and the positive charge deficient portion 63 strengthen an electric field E1 in the facing portion between the first electrode 15 and the second electrode 16 as compared with an electric field E0 in the case of FIG. 3(a).

FIG. 3(c) shows a case where the first electrode 15 and the second electrode 16 relatively move in the X direction from the state shown in FIG. 3(a). Here, the area of the facing portion between the first electrode 15 and the second electrode 16 becomes larger than that in the state shown in FIG. 3(a).

The state shown in FIG. 3(c) increases the positive charges 62 in the surface of the first electrode 15 that has been induced by the negative charges 60, while decreasing the positive charges 61 in the second electrode 16 that has been induced by the negative charges 60, as compared with the state shown in FIG. 3(a).

Therefore, when the state of FIG. 3(a) is changed to the state of FIG. 3(c) due to the vibration between the electrodes, some of the positive charges 61 induced in the second electrode 16 in FIG. 3(*a*) try to move from the second electrode 16 to the first electrode 15 via the resistor R as a current I2 (precisely, electrons try to move from the first electrode 15 to the second electrode 16). Therefore, the first electrode 15 has a negative potential with respect to the second electrode 16.

However, because this movement of the charges is hindered by the electric resistance of the resistor R, positive residual charges 65 remain in the second electrode 16 while a positive charge deficient portion 66 is generated in a part of the portion in the first electrode 15 facing the negative charges 60. The positive residual charges 65 and the positive charge deficient portion 66 weaken the electric field E2 in the facing portion between the first electrode 15 and the second electrode 16 as compared with the electric field E0 in the case of FIG. 3(*a*).

In this way, with the electric field E2 weakened, the power generation efficiency of the vibration-driven energy harvesting element 10 decreases. Therefore, when an electric power is extracted from the vibration-driven energy harvesting element 10 with the electric field E2 weakened, electrical damping is reduced to slow a conversion rate from mechanical energy to electrical energy. The environmental vibration energy (kinetic energy) accumulated in the second electrode 16 which is the movable electrode is not effectively converted into electric energy, but rather is wasted.

In the power supply circuit 50 and the vibration-driven energy harvester 100 of the first embodiment, the second electrode 12 of the vibration-driven energy harvesting element 10 is connected to the negative half-wave rectification circuit 20 via the output line W2, as shown in FIG. 1. Therefore, as in the example shown in FIG. 3(*c*), in a case where the second electrode 12 of the vibration-driven energy harvesting element 10 has a positive potential with respect to the first electrode 11, the second diode D2 of the negative half-wave rectification circuit 20 is forward-biased. Thus, the current generated in the vibration-driven energy harvesting element 10 can flow from the second electrode 12 to the first electrode 11 through the second diode D2 with substantially no resistance.

Therefore, in the power supply circuit 50 and the vibration-driven energy harvester 100 of the first embodiment, the weakening of the electric field E2 in the case where the first electrode 15 and the second electrode 16 relatively move as shown in FIGS. 3(*a*) to 3(*c*) can be prevented, so that a high power generation efficiency can be obtained.

It seems that the generated electric energy would be wasted by the current flowing from the second electrode 12 to the first electrode 11 through the diode D2. However, the electric resistance of the diode D2 against the forward current is substantially zero, and the total amount of the flowing current corresponds to the amount of charges induced in the first electrode 11 and the second electrode 12 and thus has a predetermined upper limit. Therefore, the amount of lost electrical energy ΔEG2, that is, the amount of (resistance)×(current)×(current) is also small.

Figure 4A:
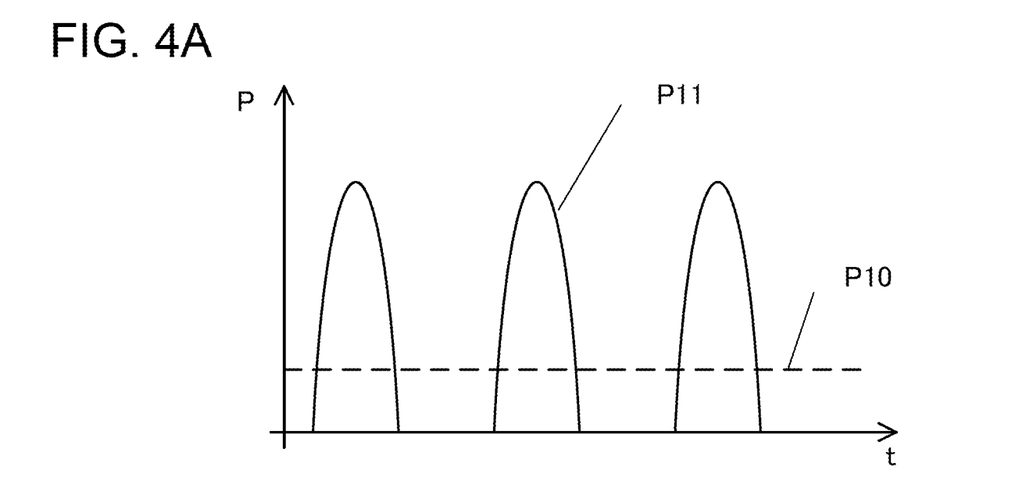
FIGS. 4A and 4B are graphs comparing power generation output in a case of using a negative half-wave rectifying circuit 20 and in a case of using a full-wave rectifying circuit.
Figure 4B:
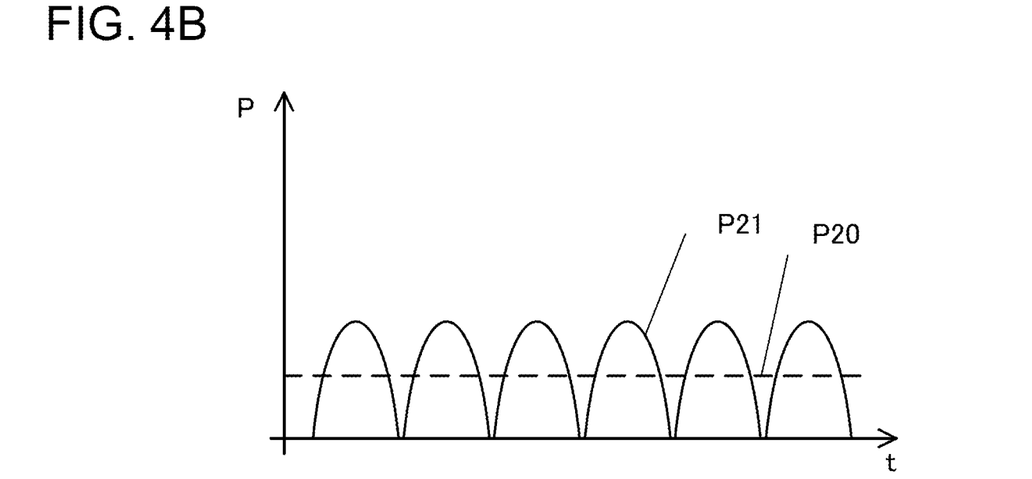

FIG. 4 is a graph that compares power generation output in a case of using the negative half-wave rectifying circuit 20 of the present embodiment and in a case of using the conventional full-wave rectifying circuit.

FIG. 4(*a*) is a graph showing a relationship between power generation output (power) P11 and time t (horizontal axis) for the negative half-wave rectifying circuit 20 of the embodiment, and FIG. 4(*b*) is a graph showing a relationship between power generation output (power) P21 and time t (horizontal axis) for a conventional full-wave rectifying circuit. The vertical axis in both figures represents output power P.

When a conventional full-wave rectifying element of diode-bridge type is used, for example, in a sinusoidal power (voltage) induced between the first electrode and the second electrode of the vibration-driven energy harvesting element with relative vibration between the electrodes, negative voltage components are inverted into positive by the full-wave rectifying element to output a power P21 approximately equal to an absolute value of the sinusoidal wave. An interval between adjacent peaks in time profile of the electric power P21 is half a period of vibration of the vibration-driven energy harvesting element.

On the other hand, for an output P11 of the negative half-wave rectifying circuit 20 of the present embodiment shown in FIG. 4(*a*), a sinusoidal power (voltage) induced between the first electrode 11 and the second electrode 12 is output only in a state where the first electrode 11 is induced to have a positive potential and the second electrode 12 is induced to have a negative potential. That is, only positive (or negative) components of the sinusoidal voltage are output. Thus, the number of peaks is half that of the output P21 in the case using the conventional full-wave rectifying circuit.

However, in the case of the vibration-driven energy harvesting element, energy of vibration applied from outside is equal to the sum of mechanical energy lost as air resistance or friction and electric energy generated by the vibration-driven energy harvesting element. Therefore, if the energy of vibration applied from outside and the lost mechanical energy are constant, a total amount of electric energy that can be extracted is constant, independent of the number of times (frequency) that electric energy is extracted.

Therefore, in the output P11 of the negative half-wave rectifying circuit 20 of the embodiment, a magnitude (power) of each peak is larger than that of the conventional output P21. Further, without taking the weakening of the electric field E2 described above into consideration, a time average P10 of the output power of the negative half-wave rectifying circuit 20 of the present embodiment is equal to a time average P20 of the output power of the device using the conventional full-wave rectifying element.

When taking the weakening of the electric field E2 described above into consideration, the weakening of the electric field E2 is unavoidable in the device using the conventional full-wave rectifying element, so that the power generation efficiency is reduced. Therefore, the time average P10 of the output power of the negative half-wave rectifying circuit 20 of the present embodiment will be larger than the time average of the output power of the conventional full-wave rectifying element.

As described above, in the present embodiment, the power from the vibration-driven energy harvesting element 10 is input to the negative half-wave rectifying circuit 2 so that the generation efficiency of the vibration-driven energy harvesting element 10 can be improved. However, the output of the negative half-wave rectifying circuit 2 may not be suitable for general use because it has a negative voltage.

Therefore, in the present embodiment, the negative voltage power output from the negative half-wave rectifying circuit 20 is input to the inverting chopper circuit 30, and the inverting chopper circuit 30 causes the negative voltage power to be inverted into a positive voltage power and output it.

The electric energy of the negative voltage output, which is output from the negative half-wave rectifying circuit 20 and is input to the inverting chopper circuit 30, is temporarily accumulated in a coil L1 in a state where a switching element T1 such as a MOS transistor for controlling a chopper timing is turned on. Then, when the switching element T1 is turned off, the energy accumulated in the coil L1 is discharged as a current due to a self-inductance of the coil L1, and the current is output to a circuit located downstream (on the right side in FIG. 1) through a rectifying diode D5.

Since the electric power input from the negative half-wave rectifying circuit 20 to the inverting chopper circuit 30 has a negative voltage, the current flows through the coil L1 from the ground side (on the lower side in FIG. 1) to the switching element T1 side, with the switching element T1 turned on. Since the rectifying diode D5 has an anode on the switching element T1 side, the rectifying diode D5 is reverse-biased with the switching element T1 turned on. Thus, no current flows through the rectifying diode D5.

When the switching element T1 is turned off, due to a self-inductance of the coil L1, the energy accumulated in the coil L1 is converted into a current that flows through the coil L1 from the ground side to the rectifying diode D5 side. At this time, an end of the coil L1 connected to the rectifying diode D5 has a positive potential with respect to the ground. Therefore, the rectifying diode D5 is forward-biased so that the current is output through the rectifying diode D5 to the voltage conversion circuit 40.

As described above, the inverting chopper circuit 30 converts the negative voltage power into a positive voltage power.

One end P3 of a second capacitor C2 is connected to a cathode of the rectifying diode D5 which is an output point P3 of the inverting chopper circuit 30, and the other end of the second capacitor C2 is connected to the ground. The positive power output from the inverting chopper circuit 30 is accumulated in the second capacitor C2 and is output from the second capacitor C2 to an input terminal Vin of the voltage conversion circuit 40.

The output power from the inverting chopper circuit 30, which is a pulsed output, is temporally made smoother by the second capacitor C2, so that the electric power can be stably supplied to the voltage conversion circuit 40. Thus, the efficiency of power transmission by the voltage conversion circuit 40 can be improved.

The voltage conversion circuit 40 converts the voltage, which is output from the inverting chopper circuit 30 and is input to the input terminal Vin, so that a voltage output from an output terminal Vout to an external load R0 has a predetermined positive constant value. As the voltage conversion circuit 40, a general switching regulator type DC/DC converter may be used. A third capacitor C3 is provided between the output terminal Vout of the voltage conversion circuit 40 and the ground, whereby the output voltage from the voltage conversion circuit 40 is further smoothed.

Note that the voltage conversion circuit 40 is a circuit for converting the positive power, which is the output from the inverting chopper circuit 30, into a voltage suitable for the external load R0. Therefore, when the voltage suitable for the external load R0 matches the output voltage of the inverting chopper circuit 30 or when the external load R0 itself has a function of converting the voltage, it is not necessary for the power supply circuit 50 to include the voltage conversion circuit 40. In this case, when the external load R0 has capacitors corresponding to the second capacitor C2 and the third capacitor C3, it is not necessary for the power supply circuit 50 to include the second capacitor C2 and the third capacitor C3.

The input point P1 of the inverting chopper circuit 30 is connected to a source of the switching element T1 formed of an nMOS transistor (nMOSFET) as one example.

In the inverting chopper circuit 30, a control for turning on and off the switching element T1 is performed by a control circuit 35 including a Zener diode D6, resistance elements R2, R3 constituting a voltage divider, a comparator circuit CP, and the like that are included in the inverting chopper circuit 30.

The power generation efficiency of the vibration-driven energy harvesting element 10 depends on the voltage of the first capacitor C1 that accumulates the power from the vibration-driven energy harvesting element 10. That is, when the first capacitor C1 is charged and an absolute value of the voltage becomes an excessive high value (an excessive large negative value in the present embodiment), the electric resistance of the first capacitor C1 against the vibration-driven energy harvesting element 10 increases, so that the power generation efficiency of the vibration-driven energy harvesting element 10 decreases. Also when the absolute value of the voltage of the first capacitor C1 becomes an excessive low value (an excessive small negative value in the present embodiment), the power generation efficiency of the vibration-driven energy harvesting element 10 decreases.

Thus, the control circuit 35 controls the switching element T1 to be turned on and off based on the voltage of the first capacitor C1 (the voltage at the input point P1 of the inverting chopper circuit 30) to maintain the voltage of the first capacitor C1 in a predetermined range near an optimum voltage V0 at which the power generation efficiency of the vibration-driven energy harvesting element 10 is highest. Specifically, the control circuit 35 performs the control such that the voltage of the first capacitor C1 is between a first reference negative voltage V1 that is lower (more negative) than the optimum voltage V0 and a high voltage V2 that is higher (more positive) than the optimum voltage V0.

Note that, in general, when the switching element T1 is turned on, the charge accumulated in the second capacitor C2 flows back to the first capacitor C1 so that the voltage of the first capacitor C1 may fluctuate. However, the present embodiment includes the inverting chopper circuit 30 between the first capacitor C1 and the second capacitor C2, and the inverting chopper circuit 30 includes the rectifying diode D5 at the output terminal. Therefore, the current from the second capacitor C2 which has a positive voltage to the first capacitor C1 which has a negative voltage is blocked by the rectifying diode D5, so that the voltage of the first capacitor C1 is not fluctuated due to the voltage of the second capacitor C2. This enables a highly accurate control on the switching element T1.

Now, the control circuit 35 will be described.

One end of the resistance element R1 is connected to the input point P1 of the inverting chopper circuit 30, the other end of the resistance element R1 is connected to an anode of the Zener diode D6, and a cathode of the Zener diode D6 is connected to the ground. Further, one end of the resistance element R2 is connected to the input point P1, one end of the resistance element R3 is connected to the other end of the resistance element R2, and the other end of the resistance element R3 is connected to the ground.

As described above, one end of the first capacitor C1 is connected to the input point P1 of the inverting chopper circuit 30, and the other end of the first capacitor C1 is connected to the ground. Therefore, the cathode of the Zener diode D6 is connected to the other end of the first capacitor C1. The resistance element R2 and the resistance element R3 configure a voltage divider that divides the voltage applied across both ends of the first capacitor C1 (voltage at the input point P1 with reference to the ground).

A voltage at a voltage dividing point P2, which is a connecting point between the resistance element R2 and the resistance element R3, is obtained by dividing the voltage at the input point P1 and is therefore proportional to the voltage at the input point P1. On the other hand, a voltage of the anode of the Zener diode D6 is a negative constant value (a breakdown voltage of the Zener diode D6) if the voltage at the input point P1 is a negative voltage with respect to the breakdown voltage of the Zener diode D6.

Therefore, by inputting the above-described two voltages to the comparator circuit CP to compare the voltages, it is possible to determine whether the voltage at the input point P1 (the voltage of the first capacitor C1) is equal to or higher than the optimum voltage V0 that maximizes the power generation efficiency of the vibration-driven energy harvesting element 10 or it is equal to or lower than the optimum voltage V0.

For the purpose of this determination, resistance values of the resistance elements R2, R3 constituting the voltage divider are set so that the voltage at the voltage dividing point P2 is substantially equal to the breakdown voltage of the Zener diode D6 when the voltage at the input point P1 of the inverting chopper circuit 30 (the voltage of the first capacitor C1) is the optimum voltage V0. In order to facilitate this setting, at least one of the resistance elements R2, R3 (in the case of FIG. 1, the resistance element R2) is preferably a variable resistor, as shown in FIG. 1.

Note that the resistance elements R2 and R3 may be capacitors, instead of the resistance elements.

The voltage of the anode of the Zener diode D6 is input to a minus-side input (first input) of the comparator circuit CP. On the other hand, the voltage at the voltage dividing point P2 is input via an input-side feedback resistor R4 to a plus-side input (second input), and an output of the comparator circuit CP is input via an output-side feedback resistor R5 to the plus-side input.

As a result, the comparator circuit CP functions as a circuit having a hysteresis. That is, in a case where the voltage at the voltage dividing point P2 changes from the positive voltage side to the negative voltage side, when the voltage at the voltage dividing point P2 reaches a predetermined first voltage lower (more negative) than the voltage input to the minus-side input, the output of the comparator circuit CP changes from zero (a ground potential) to negative. On the other hand, in a case where the voltage at the voltage dividing point P2 changes from the negative voltage side to the positive voltage side, when the voltage at the voltage dividing point P2 reaches a predetermined second voltage lower (more negative) than the voltage input to the minus-side input, the output of the comparator circuit CP changes from negative to zero (a ground potential).

Note that a resistance value of the input-side feedback resistor R4 and a resistance value of the output-side feedback resistor R5 are set so that the voltage at the voltage dividing point P2 is the first voltage or the second voltage described above when the voltage of the first capacitor C1 is the first reference negative voltage V1 or the second reference negative voltage V2 described above, respectively. In this setting, it is desirable to set the resistance values of the resistance elements R2, R3 described above together.

The output of the comparator circuit CP is input to a gate of a pMOS transistor (pMOSFET) T2. If the output of the comparator circuit CP is negative, the transistor T2 is turned on, and a voltage drop due to a current flowing through a resistance element R8 causes a gate voltage of the switching element T1 which is an nMOS transistor to be higher (more positive) than a source voltage of the switching element T1. Note that the resistance element R8 is preferably a variable resistor so that the amount of the voltage drop can be adjusted.

On the other hand, when the output of the comparator circuit CP is zero, the transistor T2 is turned off. As a result, a voltage of the gate of the switching element T1 which is an nMOS transistor is equal to the voltage of the source of the switching element T1, so that the the switching element T1 is turned off.

Note that a resistance element R7 arranged between the gate of the transistor T2 and the ground is a resistance element for discharging the output of the comparator circuit CP temporarily accumulated in the gate of the transistor T2, to the ground. The resistance element R7 is preferably a variable resistor for adjustment of discharging time.

Further, a second Zener diode D7 is an element that shuts off a second Zener diode D7 and the resistance element R8 and turns off the switching element T1 in a state where the absolute value of the voltage at the input point P1 is small and the operation of the transistor T2 is unstable.

Figure 5:
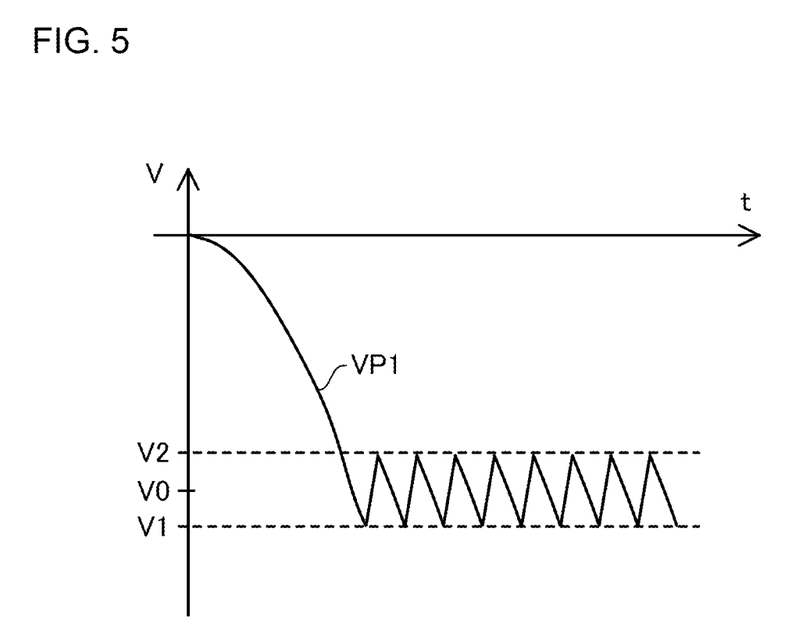
FIG. 5 is a graph showing a time profile of a voltage VP1 at an input point P1 of the inverting chopper circuit 30.

FIG. 5 is a graph showing a time profile of the voltage VP1 at the input point P1 of the inverting chopper circuit 30 (the voltage of the first capacitor C1) in the vibration-driven energy harvester 100 of the present embodiment, where the vertical axis represents voltage and the horizontal axis represents time.

When the vibration-driven energy harvesting element 10 starts power generation, negative charges are accumulated in the first capacitor C1 so that the voltage VP1 of the first capacitor C1 gradually increases its negative value.

When the voltage VP1 of the first capacitor C1 reaches the first reference negative voltage V1, the voltage at the voltage dividing point P2 proportional to the voltage VP1 reaches the above-described first voltage so that the control circuit 35 turns on the switching element T1. As a result, the charges (electrical energy) accumulated in the first capacitor C1 are discharged to flow into the coil L1 as a current and accumulated in the coil L1 as magnetic energy. Even if the switching element T1 is turned on, a negative current flows into the first capacitor C1 from the vibration-driven energy harvesting element 10 via the negative half-wave rectifying circuit 20. However, since the flow-out current toward the coil L1 is larger than the flow-in current from the negative half-wave rectifying circuit 20, the voltage VP1 of the first capacitor C1 decreases its negative value (changes to the positive direction).

In a short time after the switching element T1 has been turned on, the voltage VP1 of the first capacitor C1 reaches the second reference negative voltage V2 from the negative side, and the voltage at the voltage dividing point P2 proportional to the voltage VP1 also reaches the above-described second voltage. Then, the control circuit 35 turns off the switching element T1 to stop the discharging from the first capacitor C1 to the coil L1. Since the negative current continues to flow into the first capacitor C1 from the vibration-driven energy harvesting element 10 via the negative half-wave rectifying circuit, the voltage VP1 of the first capacitor C1 then changes to the negative side again to reach the first reference negative voltage V1.

Then, by repeating the above-described cycle, the voltage VP1 of the first capacitor C1 is maintained between the first reference negative voltage V1 and the second reference negative voltage V2, that is, near the optimum voltage V0 at which the power generation efficiency of the vibration-driven energy harvesting element 10 is highest. As a result, the vibration-driven energy harvester 100 and the power supply circuit 50 of the present embodiment can achieve a high power generation efficiency.

Second Embodiment

Figure 6:
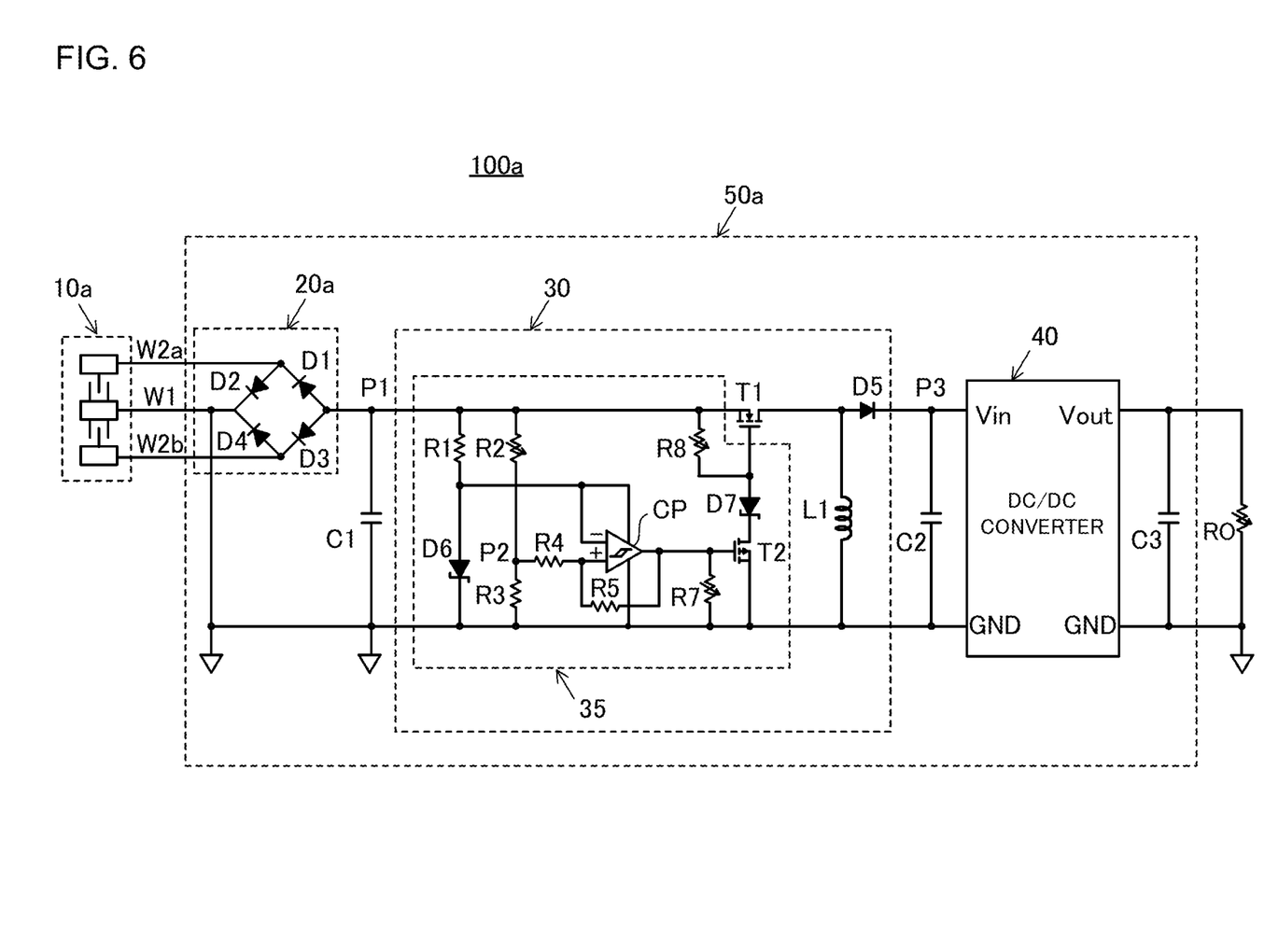
FIG. 6 is a schematic diagram showing a schematic configuration of a power supply circuit 50a and a vibration-driven energy harvester 100a of a second embodiment according to the present invention.

FIG. 6 is a schematic diagram showing a schematic configuration of a power supply circuit 50a and a vibration-driven energy harvester 100a of the second embodiment according to the present invention. Configurations of the second embodiment are almost the same as those of the first embodiment described above. Thus, the same configurations are denoted by the same reference numerals and the description thereof is omitted.

In the second embodiment, the configurations of the vibration-driven energy harvesting element 10a and the negative half-wave rectifying circuit 20a are different from those of the above-described first embodiment. However, other configurations are the same as those of the first embodiment.

Figure 7:
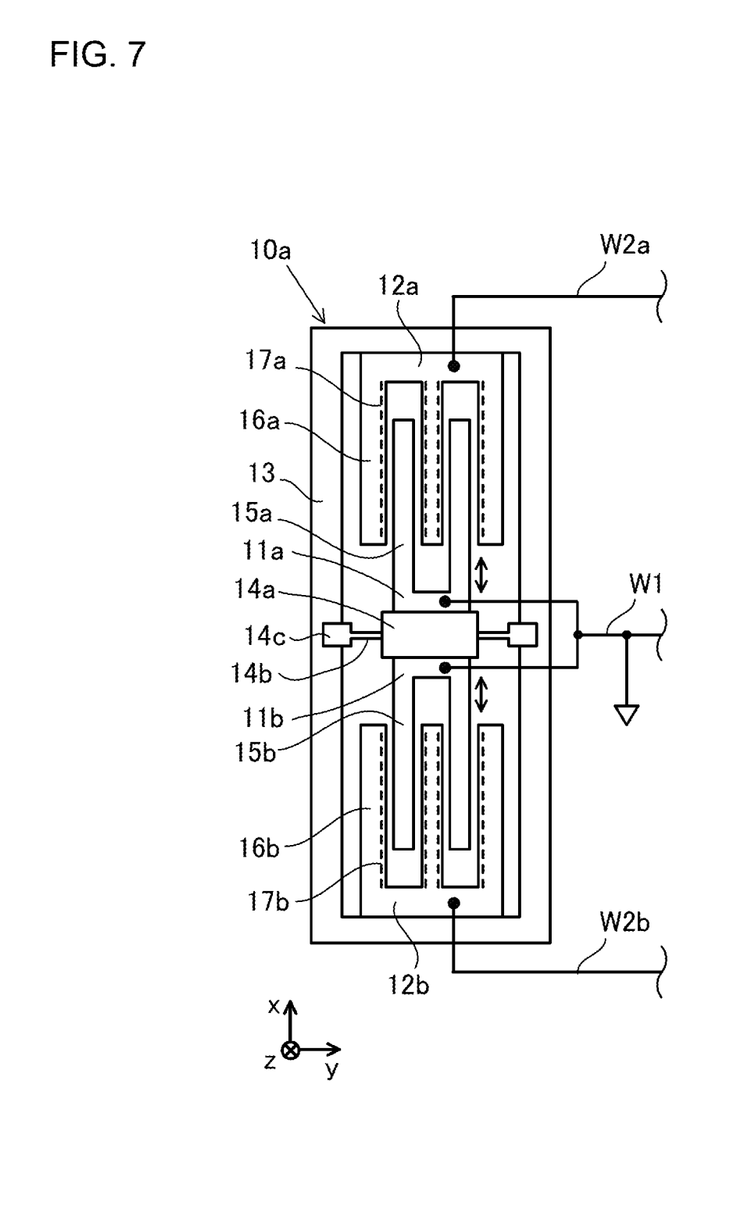

FIG. 7 is a schematic view showing the vibration-driven energy harvesting element 10a included in the vibration-driven energy harvester 100a of the second embodiment. In addition to the above-described vibration-driven energy harvesting element 10 in FIG. 4, the vibration-driven energy harvesting element 10a includes one more vibration-driven energy harvesting element 10 on the lower side in the figure and two vibration-driven energy harvesting elements 10 are arranged in parallel in a vertically inverted manner with the holding portion 14 interposed therebetween.

The second electrodes 12a and 12b, which are two fixed electrodes, are internally fixed on ends on the +X side and the −X side of the support frame 13, respectively. On the other hand, the first electrodes 11a and 11b, which are two movable electrodes, are provided on the +X side and the −X side of an electrode holding portion 14a that constitutes the holder 14, respectively. Therefore, in the same manner as in the above-described first embodiment, when the holder 14 vibrates due to vibration from outside, the first electrodes 11a, 11b vibrate in the X direction with respect to the second electrodes 12a, 12b. In the respective comb portions 16a, 16b of the second electrodes 12a, 12b, surface regions 17a, 17b on sides facing the comb portions 15a, 15b of the first electrode 11a, 11b have electrets with negative charges formed therein.

The negative half-wave rectifying circuit 20a has a configuration shown in FIG. 6, in which two negative half-wave rectifying circuits 20 shown in FIG. 1 are arranged in parallel. An output line W2a connected to the second electrode 12a is connected to a cathode of a first diode D1 and an anode of a second diode D2, which constitute an input terminal of the negative half-wave rectifying circuit 20, in the same manner as in the first embodiment described above. Further, an output line W2b connected to the second electrode 12b is connected to a cathode of a third diode D3 and an anode of a fourth diode D4, which constitute another input terminal of the negative half-wave rectifying circuit 20.

An output line W1 connected to the first electrodes 11a and 11b is connected to a ground and is further connected to a cathode of a second diode D2 and an anode of a fourth diode D4, in the same manner as in the first embodiment described above.

The anode of the first diode D1 and the anode of the third diode D3 constitute an output terminal of the negative half-wave rectifying circuit 20.

The negative half-wave rectifying circuit 20a included in the second embodiment looks like a diode bridge type full-wave rectifying circuit, but two negative half-wave rectifying circuits are arranged in parallel and thus the negative half-wave rectifying circuit 20a is not a full-wave rectifying circuit. Only when a voltage input from each one of output lines W2a and W2b is negative with reference to a voltage input from the output line W1, the power is output to the output unit. When the input voltages are positive, a current is caused to flow to the ground through the second diode D2 and the fourth diode D4.

In this way, the negative half-wave rectifying circuit 20a functions as a half-wave rectifying circuit that allows only negative voltage components of the alternating current voltage to pass therethrough. Therefore, the combination of the vibration-driven energy harvesting element 10a and the negative half-wave rectifying circuit 20a can prevent the weakening of the electric field E2 in the vibration-driven energy harvesting element 10a, so that a high power generation efficiency can be obtained, as in the first embodiment described above.

Further, as described above, in the vibration-driven energy harvesting element 10a included in the vibration-driven energy harvester 100a of the second embodiment, two vibration-driven energy harvesting elements 10 of the first embodiment are arranged in parallel, so that a further higher power generation efficiency can be obtained as compared with the vibration-driven energy harvester 100.

In both the first embodiment and the second embodiment described above, the vibration-driven energy harvesting elements 10, 10a have the first electrodes 11, 11a, 11b as movable electrodes and the second electrodes 12, 12a, 12b as fixed electrodes. However, the configuration is not limited thereto. That is, the first electrodes 11, 11a, 11b may be fixed electrodes and the second electrodes 12, 12a, 12b may be movable electrodes.

Further, instead of forming electrets with negative charges in the surface regions of the second electrodes 12, 12a, 12b, electrets with positive charges may be formed in the surface regions of the first electrodes 11, 11a, 11b. Also in this case, as described above, it is possible to prevent the electric power from being extracted from the vibration-driven energy harvesting element 10 with the electric field E2 between the electrodes weakened. Thus, the power generation efficiency can be improved.

The diodes (D1 to D4) in the negative half-wave rectifying circuit 20, 20a may be a plurality of diodes connected in series to increase a breakdown voltage.

Further, the Zener diode D6 in the control circuit 35 in the inverting chopper circuit 30 may be a plurality of Zener diodes connected in series.

Although the cathode of the Zener diode D6 in the control circuit 35 in the inverting chopper circuit 30 is directly connected to the ground in each of the above-described embodiments, the configuration is not limited thereto. The Zener diode D6 may be connected to the ground via a resistance element.

However, in this case, a voltage input to the minus-side input (first input) of the comparator circuit CP shifts to the negative side with respect to the breakdown voltage of the Zener diode D6 by an amount of a voltage drop due to a current flowing through the resistance element. Therefore, the resistance values of the resistance elements R2 and R3 may be desirably set so that the voltage at the voltage dividing point P2 input to the plus-side input (second input) of the comparator circuit CP is also shifted to the negative side by the same amount. Note that the resistance element R1 on the anode side may be omitted in the case where the cathode of the Zener diode D6 is connected to the ground via a resistance element.

The configuration of the entire control circuit 35 in the inverting chopper circuit 30 is not limited to the above-mentioned configuration and may be another configuration. For example, instead of the comparator circuit CP, an A/D conversion circuit for converting the voltage at the input point P1 into a digital value and a control logic circuit may be used. In this case, the control logic circuit is configured to turn on and off the switching element T1 when a digitally converted voltage value is the first reference negative voltage V1 or the second reference negative voltage V2, respectively.

Effects of Embodiments (1) The power supply circuit 50, 50a of each of the above-described embodiments and modifications is a power supply circuit that outputs an electric power that is input from the vibration-driven energy harvesting element 10, 10a to an external load, comprising: the negative half-wave rectifying circuit 20, 20a that half-wave rectifies an alternating current power that is input from the vibration-driven energy harvesting element 10, 10a, into a negative voltage output; the inverting chopper circuit 30 that inverts and outputs the negative voltage output which is output from the negative half-wave rectifying circuit 20, 20a, into a positive voltage output.

This configuration can cause the vibration-driven energy harvesting element 10, 10a to generate an electric power with a high efficiency, so that energy of environmental vibration can be converted into electrical energy with a high efficiency.

(2) In (1), the power supply circuit further includes the voltage conversion circuit 40 that converts the positive voltage output which is output from the inverting chopper circuit 30, and outputs the voltage to the external load. Thereby, a voltage suitable for the external load R0 can be output from the power supply circuit 50 so that the power supply circuit 50 suitable for various external loads R0 can be realized.

(3) In (1) or (2), the power supply circuit further includes a first capacitor C1 having one end connected to the output terminal of the negative half-wave rectifying circuit 20, 20a and the other end connected to the ground, the first capacitor C1 accumulating the negative voltage output which is output from the negative half-wave rectifying circuits 20, 20a and outputting it to the inverting chopper circuit 30. Thus, an electric power can be stably supplied to the inverting chopper circuit 30, and an efficiency of power transmission by the inverting chopper circuit 30 can be improved.

(4) In (3), the power supply circuit further includes a second capacitor C2 having one end connected to the output terminal of the inverting chopper circuit 30 and the other end connected to the ground, the second capacitor C2 accumulating the positive voltage output that is output from the inverting shopper circuit 30 and outputting it to the voltage conversion circuit 40. Thus, an electric power can be stably supplied to the voltage conversion circuit 40, and an efficiency of power transmission by the voltage conversion circuit 40 can be improved.

(5) In (4), the power supply circuit further includes the control circuit 35 that turns on the switching element T1 for controlling a chopper timing in the inverting chopper circuit 30 when the voltage at one end of the first capacitor C1 becomes a first reference negative voltage, and turns off the switching element T1 when the voltage at one end of the first capacitor C1 becomes a second reference negative voltage, the second reference negative voltage being more positive than the first reference negative voltage. This configuration allows the voltage of the first capacitor C1 to be maintained near the optimum voltage V0 at which the power generation efficiency of the vibration-driven energy harvesting element 10 is highest, so that the power generation efficiency can be further improved.

(6) In (5), the control circuit 35 includes: a Zener diode D6 that has an anode facing one end of the first capacitor C1 between one end and the other end of the first capacitor C1; a resistor element R1 that is arranged between the first capacitor C1 and the Zener diode D6; and the voltage divider R2, R3 that is arranged between one end and the other end of the first capacitor C1 and divides a voltage across one end of the first capacitor C1 and the other end of the first capacitor, wherein: the control circuit 35 turns on and off the switching element T1, based on a comparison and determination about which of a voltage applied across both ends of the Zener diode D6 and an output voltage of the voltage divider R2, R3 is higher or lower. Thus, based on the voltage of the first capacitor C1, the switching element T1 can be precisely turned on and off. As a result, the voltage of the first capacitor C1 can be more accurately maintained near the optimum voltage V0, and the power generation efficiency can be further improved.

(7) In (6), the resistance element R1 further has one end connected to one end of the first capacitor C1 and the other end connected to the anode of the Zener diode D6; and the cathode of the Zener diode D6 is connected to the other end of the first capacitor. With this configuration, the voltage on the anode side of the Zener diode D6 can be the breakdown voltage of the Zener diode D6 with reference to the ground. This facilitates the above-described comparison about which of the voltage applied across the Zener diode D6 with the output voltages of the voltage divider R2, R3 is higher or lower, so that a cost of the inverting chopper circuit 30 can be reduced.

(8) In (6) or (7), the control circuit 35 further includes the comparator circuit CP, the input-side feedback resistor R4, and the output-side feedback resistor R5; a voltage of the anode of the Zener diode D6 is input to the first input of the comparator circuit CP; the output voltage of the voltage divider R2, R3 is input through the input-side feedback resistor R4 to the second input of the comparator circuit CP, and the output of the comparator circuit CP is input through the output-side feedback resistor R5; and the switching element T1 is turned on and off based on the output of the comparator circuit CP. With this configuration, the control circuit 35 having a low power consumption can be realized and more electric power can be supplied to the external load R0.

(9) The vibration-driven energy harvester 100, 100a of each of the above-described embodiments and modifications includes any one of the power supply circuits 50, 50a in (1) to (8) described above; and the vibration-driven energy harvesting element 10, 10a that supplies an electric power to the power supply circuit 50, 50a.

With this configuration, energy of environmental vibration can be converted into electric energy with a high efficiency.

(10) In (9), further, in the vibration-driven energy harvesting element 10, 10a, the electrode 12, 12a, and 12b having electrets with negative charges are connected to the input terminal of the negative half-wave rectifying circuit 20 of the power supply circuit 50, 50a, and the electrode 11, 11a, 11b having no electrets formed therein is connected to the ground of the power supply circuit 50, 50a, or the electrode having no electrets formed therein are connected to the input terminal of the negative half-wave rectifying circuit 20 of the power supply circuit 50, 50a, and the electrode having electrets with positive charges formed therein is connected to the ground of the power supply circuit 50, 50a. With this configuration, it is possible to prevent weakening of the electric field of the electret-type vibration-driven energy harvesting element 10, 10a to obtain a further higher power generation efficiency.

Although various embodiments and modifications have been described above, the present invention is not limited to thereto. Additionally, the embodiments and the modifications may be applied alone or in combination. Other aspects conceivable within the technical idea of the present invention are also encompassed in the scope of the present invention.

The disclosure of the following priority application is herein incorporated by reference:
Japanese Patent Application No. 2018-105435 (filed May 31, 2018).

REFERENCE SIGNS LIST 100, 100a . . . vibration-driven energy harvester, 10, 10a . . . vibration-driven energy harvesting element, 20, 20a . . . negative half-wave rectification circuit, 30 . . . inverting chopper circuit, 35 . . . control circuit, 40 . . . voltage conversion circuit, C1 . . . first capacitor, C2 . . . second capacitor, C3 . . . third capacitor, R0 . . . external load, T1 . . . switching element, CP . . . comparator circuit, D6 Zener diode

The invention claimed is:

1. A power supply circuit that outputs an electric power that is input from a vibration-driven energy harvesting element to an external load, comprising:
a negative half-wave rectifying circuit that half-wave rectifies an alternating current power that is input from the vibration-driven energy harvesting element, into a negative voltage output;
an inverting chopper circuit that inverts and outputs the negative voltage output which is output from the negative half-wave rectifying circuit, into a positive voltage output.

2. The power supply circuit according to claim 1, further comprising:
a voltage conversion circuit that converts the positive voltage output which is output from the inverting chopper circuit, and outputs the voltage to the external load.

3. The power supply circuit according to claim 1 or 2, further comprising:
a first capacitor having one end connected to an output terminal of the negative half-wave rectifying circuit and another end connected to a ground, the first capacitor accumulating the negative voltage output which is output from the negative half-wave rectifying circuit and outputting the negative voltage output to the inverting chopper circuit.

4. The power supply circuit according to claim 3, further comprising:
a second capacitor having one end connected to an output terminal of the inverting chopper circuit and another end connected to the ground, the second capacitor accumulating the positive voltage output which is output from the inverting shopper circuit.

5. The power supply circuit according to claim 3, further comprising:
a control circuit that turns on a switching element for controlling a chopper timing in the inverting chopper circuit when a voltage at the one end of the first capacitor becomes a first reference negative voltage, and turns off the switching element when a voltage at the one end of the first capacitor becomes a second reference negative voltage, the second reference negative voltage being more positive than the first reference negative voltage.

6. The power supply circuit according to claim 5, wherein:
the control circuit comprises:
a Zener diode that has an anode facing the one end of the first capacitor between the one end and the other end of the first capacitor;
a resistor element that is arranged between the first capacitor and the Zener diode; and
a voltage divider that is arranged between the one end and the other end of the first capacitor and divides a voltage across the one end of the first capacitor and the other end of the first capacitor, wherein:
the control circuit turns on and off the switching element, based on a comparison and determination about which of a voltage applied across both ends of the Zener diode and an output voltage of the voltage divider is higher or lower.

7. The power supply circuit according to claim 6, wherein:
the resistance element has one end connected to the one end of the first capacitor and the other end connected to the anode of the Zener diode; and
the cathode of the Zener diode is connected to the other end of the first capacitor.

8. The power supply circuit according to claim 6, wherein:
the control circuit includes a comparator circuit, an input-side feedback resistor, and an output-side feedback resistor;
a voltage of the anode of the Zener diode is input to a first input of the comparator circuit;
the output voltage of the voltage divider is input through the input-side feedback resistor to a second input of the comparator circuit, and an output of the comparator circuit is input through the output-side feedback resistor; and
the switching element is turned on and off based on the output of the comparator circuit.

9. A vibration-driven energy harvester, comprising:
the power supply circuit according to claim 1; and
a vibration-driven energy harvesting element that supplies an electric power to the power supply circuit.

10. The vibration-driven energy harvester according to claim 9, wherein:
in the vibration-driven energy harvesting element,
an electrode having an electret with negative charges is connected to an input terminal of the negative half-wave rectifying circuit of the power supply circuit, and an electrode having no electret formed therein is connected to a ground of the power supply circuit, or the electrode having no electret formed therein is connected to the input terminal of the negative half-wave rectifying circuit of the power supply circuit, and the electrode having an electret with positive charges formed therein is connected to the ground of the power supply circuit.

* * * * *